(12) United States Patent
Shah et al.

(10) Patent No.: US 11,494,802 B2
(45) Date of Patent: Nov. 8, 2022

(54) GUIDING CUSTOMIZED TEXTUAL PERSUASIVENESS TO MEET PERSUASION OBJECTIVES OF A COMMUNICATION AT MULTIPLE LEVELS

(71) Applicant: INTERNATIONAL BUSINESS MACHINES CORPORATION, Armonk, NY (US)

(72) Inventors: Abhishek Shah, Jersey City, NJ (US); Ananya Aniruddha Poddar, White Plains, NY (US); Inkit Padhi, White Plains, NY (US); Nishtha Madaan, Hisar (IN); Sameep Mehta, Bangalore (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 16/742,819

(22) Filed: Jan. 14, 2020

(65) Prior Publication Data
US 2021/0217052 A1  Jul. 15, 2021

(51) Int. Cl.
| | |
|---|---|
| *G06Q 30/02* | (2012.01) |
| *G06F 40/30* | (2020.01) |
| *G06F 16/33* | (2019.01) |
| *G06Q 10/10* | (2012.01) |

(52) U.S. Cl.
CPC ..... *G06Q 30/0244* (2013.01); *G06F 16/3344* (2019.01); *G06F 40/30* (2020.01); *G06Q 10/10* (2013.01)

(58) Field of Classification Search
CPC .................................................. G06Q 30/0244
See application file for complete search history.

(56) References Cited

U.S. PATENT DOCUMENTS

| | | | |
|---|---|---|---|
| 8,484,035 B2 | 7/2013 | Pentland | |
| 9,710,829 B1* | 7/2017 | Sitapara | G06Q 30/0276 |
| 2015/0302436 A1* | 10/2015 | Reynolds | G06Q 10/06 705/7.32 |
| 2016/0358205 A1 | 12/2016 | Beltramo, Jr. | |
| 2018/0143986 A1* | 5/2018 | Sinha | G06Q 30/0242 |

(Continued)

OTHER PUBLICATIONS

No Author, "Sentiment Analysis: The Only Guide You'll Ever Need", Monkey Learn, accessed online from <https://monkeylearn.com/sentiment-analysis/> as of Nov. 14, 2019, 61 pages.

(Continued)

*Primary Examiner* — Azam A Ansari
(74) *Attorney, Agent, or Firm* — Edward J. Wixted, III

(57) ABSTRACT

A service receives a persuasion-based input comprising a text and one or more marketing objectives to persuade a desired response. The service evaluates persuasion values of text segments of the text and persuasion transition values consecutively between respective persuasion values of the persuasion values across the text segments. The service generates a desired curve of persuasion factors across the text segments according to the one or more marketing objectives. The service recommends one or more replacement words to replace one or more selected words in text to move a deviation between the persuasion values and transition values in comparison to the desired curve of persuasion factors.

18 Claims, 4 Drawing Sheets

(56) References Cited

U.S. PATENT DOCUMENTS

2019/0065610 A1* 2/2019 Singh ................ G06F 16/9535
2019/0236139 A1* 8/2019 DeFelice ............... G06F 40/56

OTHER PUBLICATIONS

Hu, T et al, "Touch Your Heart: A Tone-aware Chatbot for Customer Care on Social Media", Proceedings of the 2018 CHI Conference on Human Factors in Computing Systems, Apr. 2018, 12 pages.

Li, J et al, "Delete, Retrieve, Generate: A Simple Approach to Sentiment and Style Transfer", Proceedings of the 2018 Conference of the North {A}merican Chapter of the Association for Computational Linguistics: Human Language Technologies, vol. 1 (Long Papers), Jun. 2018, 10 pages.

Shen et al, "Style transfer from non-parallel text by cross-alignment", Advances in Neural Information Processing Systems, 2017, pp. 6833-6844, 12 pages.

* cited by examiner

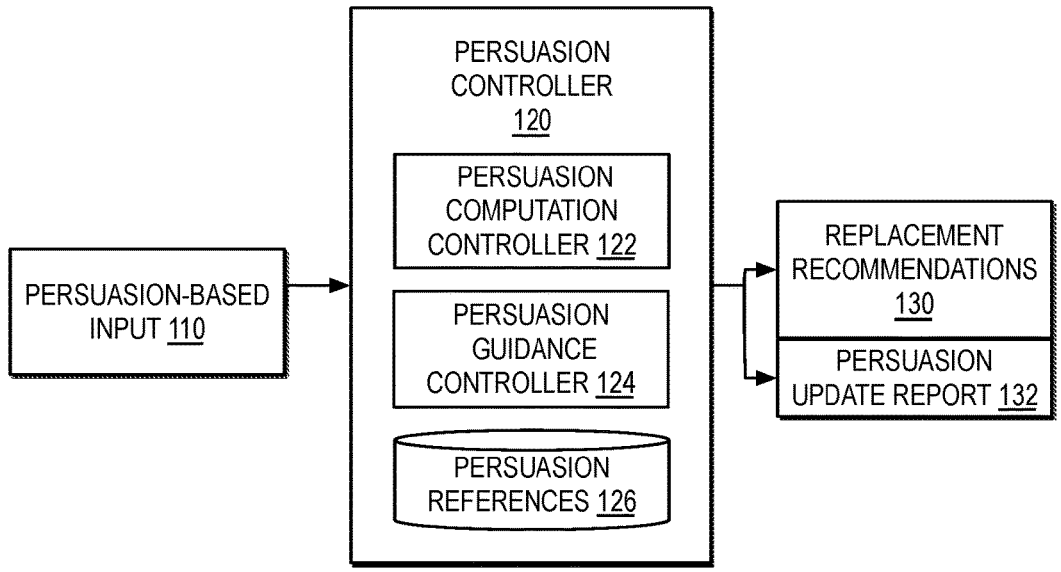
FIG. 1
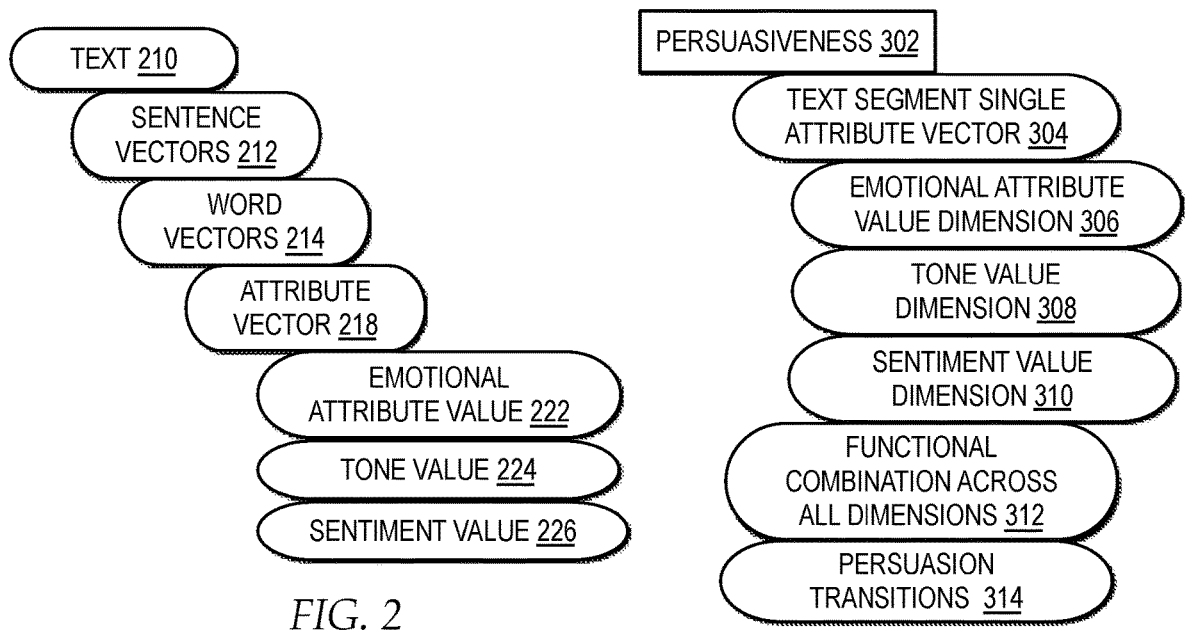
FIG. 2
FIG. 3

GUIDING CUSTOMIZED TEXTUAL PERSUASIVENESS TO MEET PERSUASION OBJECTIVES OF A COMMUNICATION AT MULTIPLE LEVELS

BACKGROUND

1. Technical Field

One or more embodiments of the invention relate generally to natural language processing and particularly to guiding customized textual persuasiveness to meet the persuasion objectives of a communication at multiple levels.

2. Description of the Related Art

Persuasive writing is one type of writing that relies careful word choices, typically using logic and reason to show a point of view, with an intention to convince a reader of a position taken in the point of view. In marketing products or services, persuasive writing is often applied in crafting marketing messages in sales letters for promoting the products or services.

BRIEF SUMMARY

In one embodiment, a method is directed to receiving, by a computer, a persuasion-based input comprising a text and one or more marketing objectives to persuade a desired response. The method is directed to evaluating, by the computer, a plurality of persuasion values of a plurality of text segments of the text and a plurality of persuasion transition values consecutively between respective persuasion values of the plurality of persuasion values across the plurality of text segments. The method is directed to generating, by the computer, a desired curve of persuasion factors across the plurality of text segments according to the one or more marketing objectives. The method is directed to recommending, by the computer, one or more replacement words to replace one or more selected words in text to move a deviation between the plurality of persuasion values and plurality of transition values in comparison to the desired curve of persuasion factors.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to receive a persuasion-based input comprising a text and one or more marketing objectives to persuade a desired response. The stored program instructions comprise program instructions to evaluate a plurality of persuasion values of a plurality of text segments of the text and a plurality of persuasion transition values consecutively between respective persuasion values of the plurality of persuasion values across the plurality of text segments. The stored program instructions comprise program instructions to generate a desired curve of persuasion factors across the plurality of text segments according to the one or more marketing objectives. The stored program instructions comprise program instructions to recommend one or more replacement words to replace one or more selected words in text to move a deviation between the plurality of persuasion values and plurality of transition values in comparison to the desired curve of persuasion factors.

In another embodiment, a computer program product comprises one or more computer readable storage media having program instructions collectively stored thereon, wherein the one or more computer readable storage media are not a transitory signal per se. The program instructions are executable by a computer to cause the computer to receive, by a computer, a persuasion-based input comprising a text and one or more marketing objectives to persuade a desired response. The program instructions are executable by a computer to cause the computer to evaluate, by the computer, a plurality of persuasion values of a plurality of text segments of the text and a plurality of persuasion transition values consecutively between respective persuasion values of the plurality of persuasion values across the plurality of text segments. The program instructions are executable by a computer to cause the computer to generate, by the computer, a desired curve of persuasion factors across the plurality of text segments according to the one or more marketing objectives. The program instructions are executable by a computer to cause the computer to recommend, by the computer, one or more replacement words to replace one or more selected words in text to move a deviation between the plurality of persuasion values and plurality of transition values in comparison to the desired curve of persuasion factors.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 1 illustrates a block diagram of one example of a persuasion controller for guiding customization of a communication to meet one or more persuasion objectives of the communication at multiple levels;

FIG. 2 illustrates a block diagram of one example of the levels and dimensions of vectors of a communication analyzed by a persuasion controller;

FIG. 3 illustrates a block diagram of one example of the multiple factors applied by a persuasion computation controller to the multi-dimensional attribute vectors of words of a text segment to determine a persuasiveness value of a text segment.

DETAILED DESCRIPTION

Figure 4:
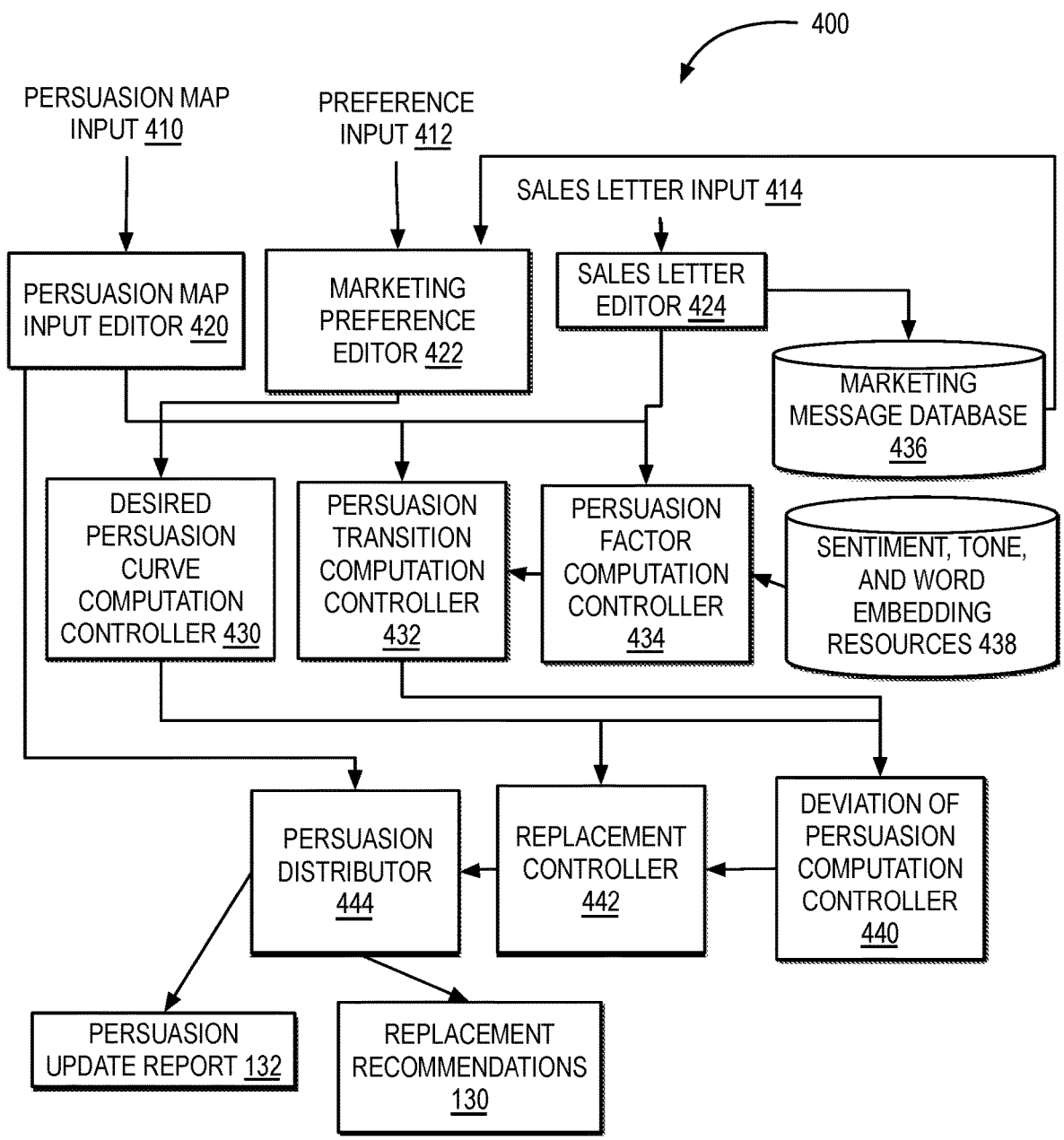
FIG. 4 illustrates a block diagram of one example of a persuasion controller for supporting guided customization of a sales letter communication to meet one or more persuasion objectives of the sales letter at multiple levels that support multiple types of persuasion objectives.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

FIG. 1 illustrates a block diagram of one example of a persuasion controller for guiding customization of a communication to meet one or more persuasion objectives of the communication at multiple levels.

In one example, a persuasion controller 120 receives a persuasion-based input 110 that includes one or more of elements of a communication that is intended to be persuasive in nature and text that indicates the goals and other persuasion objectives for a communication that is intended to be persuasive in nature. In one example, persuasion-based input 110 may be specified for a type of interface receiving the input. For example, persuasion-based input 110 may include communication text, such as a sales letter, and one or more objectives, such as, but not limited to, marketing preferences and an intended persuasion map of a sales letter. In one example, marketing preferences may include, but are not limited to, marketing objectives including one or more specific phrases, a punchline of specific text, and a set of features of a sales letter of high importance. In one example, an intended persuasion map may specify one or more of an expected persuasion type and value of a sales letter overall and of individual text segments and sub-segments of the sales letter.

In one example, a sales letter may represent one type of communication designed to persuade a reader to purchase, test, or select to view a product or service. A sales letter may be drafted for print or internet-based distribution, where internet-based distribution may include, but is not limited to, an email, a webpage, a chatbot interface, a social media interface, and other textual interfaces that support internet-based communications. In one example, a sales letter may refer to a communication that is primarily textual-based, but may include non-textual elements and may include text incorporated into non-textual elements.

In one example, a sales letter may include one or more general elements such as, but not limited to, a headline, body copy, a conclusion, and graphic design. Each of the elements may be customized for a particular product, service, or action and for the medium of communication of the sales letter.

In one example, the headline element of a sales letter may be drafted as a title or headline, and may include sub-headings. When sent in an email format, a subject line of the email may serve as the headline element. When published in a webpage format, a title of the webpage may be formatted to serve as the headline element.

In addition, in one example, the body copy element of a sales letter may be different lengths of text. In addition, body copy elements of a sales letter may include or refer to pictures or other graphical elements about a product or service. When supported as an internet-based communication, body copy elements of a sales letter may also include embedded video and audio elements.

In one example, a conclusion of a sales letter may include a final statement intended to procure a desired reaction from the reader, in the form of a punchline, such as a commitment to purchase a product or service or a selection to view additional information or a sales interface. In one example, when supported as an internet-based communication, conclusion elements of a sales letter may include text and selectable options, where a user selects the selectable option to take the action requested in the text.

In one example, persuasion controller 120 outputs one or more types of guides, including replacement recommendations 130 and a persuasion update report 132, within one or more types of interfaces, to provide step-by-step guidance to a user drafting a persuasive communication based on persuasion-based input 110, of how to modify the communication to meet goals in a persuasion map, at an overall message level and a segment level. In one example, persuasion controller 120 may provide the step-by-step guidance by generating replacement recommendations 130 of words and n-grams to replace existing words and n-grams at one or more points in a sales letter, to make the sales letter consistent and smooth in terms of how the persuasion levels progress in the sales letter and to ensure that the sales letter persuasion levels follow an intended persuasion map or other goals provided. In addition, persuasion controller 120 generates a persuasion update report 132 in one or more modes, such as a textual mode or a visual mode, that indicates the resulting persuasion levels of a communication.

In one example, to provide guidance based on persuasion-based input 110, persuasion controller 120 applies one or more functions of a persuasion computation controller 122 to evaluate persuasion scoring as a whole and at a segment level, and across transitions of segments, and applies one or more functions of a persuasion guidance controller 124 to generate replacement recommendations 130 and persuasion update report 132. Persuasion computation controller 112 and persuasion guidance controller 124 may apply one or more resources from among persuasion references 126 to customize the goals, scoring, and guidance recommended depending on the type of input in persuasion-based input 110. In additional or alternate embodiments, persuasion controller 120 may include additional or alternate controllers and resources.

In the example, a user drafting a persuasive communication may have a goal to apply one or more marketing message guidance frameworks to improve persuasiveness, such as, but not limited to, writing a sales letter using a product or service benefit in terms of a pre-sale message, story-writings, and review writing for the product or service to be sold. While a user drafting a persuasive communication may have an approximate objective sense of how persuasive the different portions of the communication may be, the overall persuasiveness of a communication may present itself over a selection of text segments each of varying persuasion factors, and be impacted by how the persuasion factors transition between different text segments. In particular, each individual text segment, such as a sentence or other sequence of words, may have its own persuasion factors, such as, but not limited to, tone, sentiment, emotion, and stance with respect to items, people, and others. In addition, in particular, each text segment may transition from one persuasion state to another, when reading from one text segment to a next text segment.

According to an advantage of the present invention, persuasion controller 120 supports guided customization of persuasive communications, at an overall message and segment level, by generating customized replacement recommendations based on evaluating individual text segment persuasion factors and also evaluating the transitions from one persuasion factor to another, over consecutive text segments, while also safeguarding selected marketing preferences presented in persuasion-based input 110 such as, but not limited to, marketing objectives, punchlines, and a set of features of high importance. For example, persuasion controller 120 may receive persuasion-based input 110 of a sales letter with an intended persuasion map of an expected persuasion type, as a user drafts the sales letter, evaluate persuasion factors for text segments and transitions between text segments, evaluate replacement recommendations of words and n-grams within the draft in view of a message guidance framework in persuasion references 126 for the expected persuasion type, and output the replacement words and n-grams as replacement recommendations 130, to provide the user with guides while writing the sales letter to achieve a persuasive message overall and at the text segment level. In another example, persuasion controller 120 may receive persuasion-based input 110 of a sales letter, perform an objective evaluation of the persuasion transitions across the overall sales letter, and represent the persuasion transition scoring as a textual report, visual plot or graph, heatmap, or a continuously updated visual colorgram of a visual representation of a numeric matrix of transition scoring data using colors to indicate values.

In addition, according to an advantage of the present invention, persuasion controller 120 may be provided as a service of a natural language processing (NLP) system or other type of artificial intelligence (AI) system that supports a client interface, such as a customer service interface or sales interface. For example, when implemented as a service through which users draft a customer service response or sales response to potential or current customers through a chat interface, persuasion controller 120 provides a service for guiding users with replacement words to achieve an intended level of persuasion.

FIG. 2 illustrates a block diagram of one example of the levels and dimensions of vectors of a communication analyzed by a persuasion controller.

In one example, a text 210 of persuasion-based input 110 may include one or more words, arranged in one or more formats, including, but not limited to, catch phrases, paragraphs, and sentences. In one example, persuasion computation controller 122 implements one or more classifiers that each enable abstraction of one or more levels of a communication into vectors, and include vectors of multi-dimensional attributes at the word attribute vector level, to facilitate an evaluation of persuasion factors at a text segment level and over transitions of text segments.

For example, in one embodiment, persuasion computation controller 122, implements one or more classifiers at a sentence-level to identify sentence vectors 212 within text 210, one or more classifiers as a word-level to identify word vectors 214 within sentence vectors 212, and one or more classifiers to model each word with an attribute vector 218, where each attribute vector 218 is further modeled with multiple values for each dimension of attribute. In the example, the dimensions of an attribute may include, but are not limited to, an emotional attribute value 222 identified for an emotional dimension of a word, a tone value 224 identified for a tone value of a word, and a sentiment value 226 identified for a sentimental value of a word. In additional or alternate embodiments, attribute vector 218 may include additional or alternate dimensions such as stance with respect to items, people, or others.

In one example, persuasion computation controller 122 may one or more types of classifiers that are specified for performing word embedding to model a set of words or phrases, which may be also referred to as an n-gram, to vectors of numerical values that are called embedding. In one example, by mapping words or phrases to vectors of numerical values, persuasion computation controller 122 may manage large volumes of sentences and words as vector values, rather than text strings.

In one example, persuasion computation controller 122 may implement one or more types of classifiers that are specified for modeling emotional attribute value 222. In one example, an emotional attribute analysis classifier may evaluate an underlying emotion behind a message, where the underlying emotion may include, but is not limited to, happy, sad, angry, fearful, excited, or bored.

In one example, persuasion computation controller 122 may implement one or more types of classifiers that are specified for modeling tone value 224. In one example, a tone analysis classifier may evaluate one or more tone aspects including, but not limited to, joy, fear, sadness, anger, analytical confident, and tentative tones present in text.

In addition, in one example, persuasion computation controller 122 may implement one or more types of classifiers that are specified for modeling sentiment value 226. In one example, a sentiment analysis classifier may evaluate positive, negative or neutral opinions from text. For example, persuasion computation controller 122 may implement sentiment analysis classifiers trained to analyze and classify the sentiment of longer texts. In another example, persuasion computation controller 122 may implement sentiment analysis classifiers trained based on one or more multi-language or multi-cultural sentiment dictionaries such as, but not limited to, the multi-perspective question answering (MPQA) subjectivity sense annotations, Bing Liu's sentiment lexicon, and SentiWorldNet.

According to an advantage of the invention, while a user may have an approximate intuitive sense of how persuasive a text segment needs to be, persuasion controller 120 may train classifiers and other natural language processing (NLP) based tools to simultaneously and objectively classify text and evaluate the persuasiveness of text segments, at multiple dimensions, individually and across transitions between text segments, at a complexity of evaluation that is beyond what a human would simultaneously be able to objectively evaluate.

FIG. 3 illustrates a block diagram of one example of the multiple factors applied by a persuasion computation controller to the multi-dimensional attribute vectors of words of a text segment to determine a persuasiveness value of a text segment.

In the example, persuasion computation controller 122 evaluates a persuasiveness 302 value of text segments of a communication at multiple levels. A text segment includes one or more consecutive words within a communication. For example, a unit of text in a communication may refer to a larger unit of text, such as a paragraph. For example, a smaller unit of text, also referred to as a text segment, may include a simple sentence or a sub-sentence of a simple sentence, such as a clause or a part of a compound or complex sentence. In one example, a unit of text and a text segment may refer to the same consecutive selection of words.

In one embodiment, to evaluate persuasiveness 302 of a text segment, persuasion computation controller 122 may apply a classifier to arbitrarily partition a larger text unit, such as a paragraph, into smaller text segments, such as sentences and sub-sentences. For example, first, persuasion computation controller 122 evaluates persuasiveness at a text segment level defined by as a linear transformation of the attribute vectors of words of a text segment, identified in the level of attribute vector 218. To perform the linear transformation, persuasion computation controller 122 first combines all attribute vectors of words that occur within a particular text segment, by attribute vector dimension, into a single attribute vector 304, by considering the corresponding dimensions of the attribute values of the word vectors in the text segment. For example, persuasion computation controller 122 calculates one or more of an average, maximum, minimum, sum, product, or log-sum of the attribute values of each dimension of each attribute vector value of the words in a text segment. In the example, an emotional attribute value dimension 306 represents the combination of emotional attribute values of words in a text segment, a tone value dimension 308 represents the combination of tone values of words in a text segment, and a sentiment value dimension 310 represents the combination of sentiment values of words in a text segment. In additional or alternate examples, text segment single attribute vector 304 may include additional or alternate types of dimension values if evaluated in attribute vector 218.

In the example, to finish the linear transformation, persuasion computation controller 122 subsequently calculates a functional combination across all dimensions 312 of single attribute vector 304 to calculate an overall persuasiveness for a text segment. For example, scoring controller 142 functionally combines emotional attribute value dimension 306, tone value dimension 308, and sentiment value dimension 310 to calculate the value of persuasiveness for a text segment.

Next, persuasion computation controller 122 calculates the persuasiveness of a communication at multiple levels by computing persuasion transitions 314, from one persuasion state to another as identified by the persuasion state identified in functional combination across all dimensions 312 for each text segment. For example, in one embodiment, a classifier of persuasion computation controller 122 tests the partitioning by joining two or more successive text segments or further splitting one or more text segments. In addition, the classifier may identify the different persuasion types and levels of different text segments obtained, and the sequence of classifications for the sequence of text segments creating the bigger text unit, such as a paragraph, to evaluate the persuasiveness of the combined text segments.

According to an advantage of the invention, while a user may have an approximate intuitive sense of how persuasive a text segment needs to be, persuasion controller 120 may train classifiers and other natural language processing (NLP) based tools to simultaneously and objectively classify text and evaluate the persuasiveness of text segments, at multiple dimensions, individually and across transitions between text segments, at a complexity of evaluation that is beyond what a human would simultaneously be able to objectively evaluate.

FIG. 4 illustrates a block diagram of a persuasion controller for supporting guided customization of a sales letter communication to meet one or more persuasion objectives of the sales letter at multiple levels that support multiple types of persuasion objectives.

In the example, a persuasion support system 400 supports multiple types of interfaces for user input of multiple types of data as persuasion-based input 110. In one example, the interfaces may be integrated as a single interface that receives and guides multiple types of data or may support different text editing interface functions for receiving and guiding each of the types of data. In one embodiment, persuasion support system 400 is provided as a service, integrated within a service, or accesses components provided as a service to one or more clients.

In one example, persuasion support system 400 supports a sales letter editor 424, as an interface for receiving sales letter input 414 of a sales letter draft from a user. In one example, sales letter editor 424 may receive sales letter input 414 of text and provide an analysis function that identifies the key components of a sales letter such as, but not limited to, a headline, body copy, a conclusion, and graphical elements. In another example, sales letter editor 424 may provide an interface that provides entry points for one or more types of recommended components of a sales letter. In yet another example, sales letter editor 424 may provide one or more templates of examples of text copy for a user to select to modify within the template editor interface.

In addition, persuasion support system 400 supports a marketing preference editor 422, as an interface for receiving one or more marketing objectives, punchlines, and one or more features of high importance in preference input 412 from a user. In one example, a marketing objective may include, but is not limited to, a product or service to sell, collection of leads, or persuading a customer to select a particular hyperlink, select to view particular content, or select to re-post particular content on the customer's social media account. In one example, punchlines may include one or more specific potential text segments or words anywhere within a sales letter or in a specific portion of a sales letter. In one example, additional features of high importance may include features of high importance for an identified product or service, such as the unique selling points (USPs), to include in the sales letter.

In one example, sales letter editor 424 may interface with a marketing message database 436 that includes one or more templates or goals for sales letters associated with one or more marketing objectives, headlines, punchlines, and high importance features. In one example, based on sales letter input 414 to sales letter editor 424, sales letter editor 424 may identify, based on data available in marketing message database 436, one or more marketing preferences associated with the sales letter input and provide the resulting marketing preferences as inputs to marketing editor 422. In one example, preference input 412 may supplement or override marketing preferences driven by marketing message database 436.

Further, persuasion support system 400 supports a persuasion map input editor 420, as an interface for receiving one or more parameters of a persuasion map in persuasion map input 410. In one example, the input for setting the parameters of the persuasion map may include, but is not limited to, one or more of a selection of expected persuasion types and a persuasion value of the overall sales letter and individual text segments of the sales letter.

In the example, persuasion support system 400 applies the one or more inputs from among user input 410, user input 412, and user input 414 to determine step by step guidance for adjusting a sales letter at one or more points to make the sales letter consistent and smooth in terms of how the persuasion levels progress and to ensure that the sales letter persuasion levels meet the parameters of a persuasion map, as well as safeguarding marketing preferences.

In the example, persuasion computation controller 122 may include multiple controllers that perform multiple types of analysis of the user inputs. For example, persuasion computation controller 122 may include a persuasion factor computation controller 434 and a persuasion transition computation controller 432.

In one example, persuasion factor computation controller 434, receives the sales letter from sales letter editor 424, persuasion map goals from persuasion map input editor 420, and accesses sentiment, tone, and word embedding resources 438. Persuasion factor computation controller 434 computes multi-dimensional persuasion attribute vectors of tone, sentiment, emotion, and stance from word attribute vectors for each individual text segment. In one example, sentiment, tone, and word embedding resources 438 may include lexicons or other resources for training classifiers or classifiers specified by one or more resources for analyzing and identifying different dimensions of words, such as classifiers specified for analyzing each of emotion, tone, and sentiment, along with classifiers specified for analyzing word embedding vectors.

In one example, persuasion transition computation controller 432 receives persuasion attribute vectors computed by persuasion factor computation controller 434, as well as the sales letter from sales letter editor 424 and persuasion map parameters from persuasion map input editor 420. Persuasion transition computation controller 432 computes the persuasion transition value from one persuasion state to the other, from one text segment over to the next, manifesting over the persuasion factors. In the example, persuasion transition computation controller 432 computes, within each text segment, transitions from one persuasion factor to another, over its constituent text, such as sentences, words, or paragraphs.

In one example, persuasion guidance controller 124 may include multiple functional components including, but not limited to, a desired persuasion curve computation controller 430, a deviation of persuasion computation controller 440, a replacement controller 442, and a persuasion distributor 444. In additional or alternate embodiments, persuasion guidance controller 124 may include additional or alternate functional components.

In one example, a desired persuasion curve computation controller 430, receives a persuasion map from persuasion map input editor 420 and one or more of marketing preferences from marketing preference editor 422. In the example, for each size of unit of text identified in the persuasion map received from persuasion map input editor 420, desired persuasion curve computation controller 430 computes a smooth pathway of one or more dimensions of persuasion factors, from entry to exit, as numerical values. In particular, in one embodiment, a unit of text refers to one or more sizes of text segments.

In one example, if the marketing preferences received from marketing preference editor 422 specify a set of features of high importance that need higher persuasion levels, desired persuasion curve computation controller 430 detects the text segments that include one of the features of high importance and may select one or more options for managing these features of high importance. In one embodiment, desired persuasion curve computation controller 430 manages features of high importance in text segments by safeguarding the text segment and not providing a desired curve for the text segment. In another embodiment, desired persuasion curve computation controller 430 manages features of high importance in text segments by further boosting the persuasion value recommendations, such as by adjusting the values of a desired curve to provide for more sudden transitions to a desired final persuasion value of the text segment.

In the example, deviation of persuasion computation controller 440 receives persuasion attribute vectors and transition values by text segment from persuasion transition computation controller 432 and receives a desired curve of persuasion factors from desired persuasion curve computation controller 430. Deviation of persuasion computation controller 440 performs a curve fitting process of the desired curve to the persuasion attribute vectors and transition values by text segment to direct selection of words or n-grams with similar meaning for each text segment where curve fitting is required, to guide the persuasion factor value for a text segment towards the targeted value in the desired curve for the text segment. In the example, replacement controller 442 selects the chosen words or n-grams as recommendations for inclusion in the sales letter by replacing some of the existing words or n-grams.

In one example, a persuasion map may define as a unit of text with four sentences with a desired starting sentiment of "+0.4" and tone of "+0.6" and a desired ending sentiment of "−0.2" and tone of "+0.8". In the example, desired persuasion curve computation controller 430 creates a desired curve by taking a progressive convergence and assigning "<sentiment, tone>=<+0.4, +0.6>" for the first sentence, "<sentiment, tone>=<+0.2, +0.67>" for the second sentence, "<sentiment, tone>=<+0, +0.74>" for the third sentence, and "<sentiment, tone>=<−0.2, +0.8>" for the fourth sentence. In the example, if the first sentence of the paragraph has an actual persuasion value of "<sentiment, tone>=<+0.5, +0.5>, then deviation of persuasion computation controller 440 recommends a selection of existing words to replace in the first sentence so that the sentiment is reduced down by "0.1" to as close to the desired curve value of "+0.4" as possible, and simultaneously the tone is boosted by "0.1" to as close to the desired curve value of "+0.6" as possible and replacement controller 442 selects words or n-grams to use as the replacement for the existing words to reach the desired values.

In one embodiment, if the marketing preferences specified by marketing preference editor 422 include a punchline, replacement controller 442 may protect the punchline may be protected from modification. In the example, in addition to protecting the punchline from modification, if replacement controller 442 detects that the deviation of the punchline is higher than a threshold with respect to the persuasion of the adjoining text, regardless of where it appears, replacement controller 442 may record the deviation so that the deviation may be highlighted in a guiding report to the user.

In one embodiment, if the marketing preferences specified by marketing preference editor 422 identify a portion of a sales letter as delivering a marketing objective, then that portion of the sales letter may also be protected from modification by replacement controller 442. In the example, if replacement controller 442 detects that a portion of the sales letter is marked as delivering a marketing objective, but the deviation is higher than a threshold with respect to the persuasion of the adjoining text, regardless of where it appears, replacement controller may record the deviation so that the deviation may be highlighted in a guiding report to the user.

In the example, persuasion distributor 444 receives recommendations of words and n-grams to replace in text segments, suggested words and n-grams to use as replacements, and any deviation highlights from replacement controller 442, along with the persuasion map from persuasion map input editor 420. In the example, persuasion distributor 444 may update a final version of the sales letter to reflect the recommended words to replace and suggested word replacements, as illustrated by replacement recommendations 130, for output in an interface of sales letter editor 424, for further user review. In addition, persuasion distributor 444 may generate one or more types of reports, output in persuasion update report 132, for guiding the user with step-by-step recommended adjustments to a sales letter at different points to render the sales letter consistent and smooth in terms of persuasion transitions and to follow a desired persuasion map.

In one example, persuasion update report 132 includes a textual report that provides the persuasion vectors of each of the text units as computed by persuasion factor computation controller 434 and persuasion transition computation controller 432 and the deviation of each text unit from the desired curve as determined from the persuasion map as computed by deviation of persuasion computation controller 440. In one example, persuasion update report 132 also includes a visual report, such as a visual plot or graph of the distribution of persuasion values at the text segment level and over transitions of text segments as compared with the deviations from the desired curve and a visual colorgram. In one example, a visual colorgram illustrates an evolution of the persuasion over the text segments using colors specified for each type and level of persuasion, as well as the combination of persuasion types of levels, and may illustrate intermediate discontinuities in the event of a sudden change of persuasion level or mode. In another example, a visual colorgram illustrates the final deviation of each text segment from the persuasion map. In particular, according to an advantage of the present invention, while the persuasion values and persuasion transition values of text segments may be calculated as numerical vector values, by generating a visual representation of the numerical vector values in comparison with the visual representation of the numerical values of the desired curve and deviations from the desired curve, the user is provided with a visual representation of the differences between the actual and desired persuasiveness of a sales letter, at multiple levels and attribute dimensions, in a format that quickly pinpoints areas for the user to make changes in sales letter to more objectively tune language toward persuasion objectives than the user would achieve through receiving large volumes of raw numerical data alone.

Figure 5:
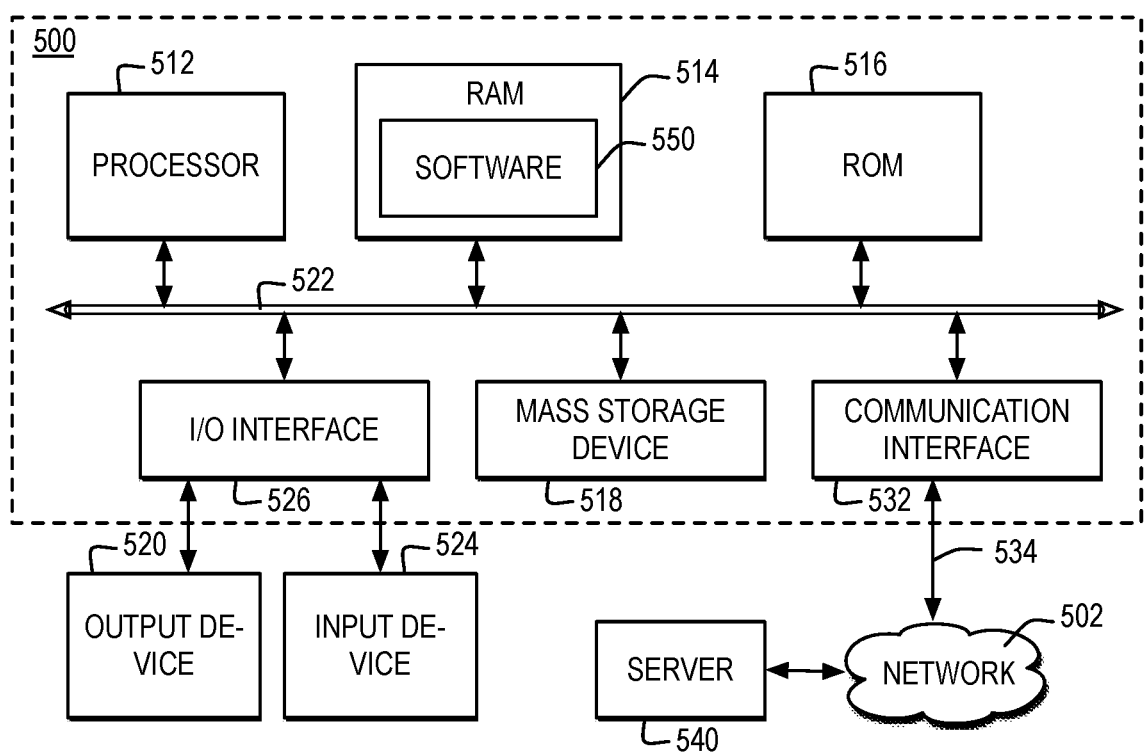
FIG. 5 illustrates a block diagram of one example of a computer system in which one embodiment of the invention may be implemented.

FIG. 5 illustrates a block diagram of one example of a computer system in which one embodiment of the invention may be implemented. The present invention may be performed in a variety of systems and combinations of systems, made up of functional components, such as the functional components described with reference to a computer system 500 and may be communicatively connected to a network, such as network 502.

Computer system 500 includes a bus 522 or other communication device for communicating information within computer system 500, and at least one hardware processing device, such as processor 512, coupled to bus 522 for processing information. Bus 522 preferably includes low-latency and higher latency paths that are connected by bridges and adapters and controlled within computer system 500 by multiple bus controllers. When implemented as a server or node, computer system 500 may include multiple processors designed to improve network servicing power.

Processor 512 may be at least one general-purpose processor that, during normal operation, processes data under the control of software 550, which may include at least one of application software, an operating system, middleware, and other code and computer executable programs accessible from a dynamic storage device such as random access memory (RAM) 514, a static storage device such as Read Only Memory (ROM) 516, a data storage device, such as mass storage device 518, or other data storage medium. Software 550 may include, but is not limited to, code, applications, protocols, interfaces, and processes for controlling one or more systems within a network including, but not limited to, an adapter, a switch, a server, a cluster system, and a grid environment.

Computer system 500 may communicate with a remote computer, such as server 540, or a remote client. In one example, server 540 may be connected to computer system 500 through any type of network, such as network 502, through a communication interface, such as network interface 532, or over a network link that may be connected, for example, to network 502.

In the example, multiple systems within a network environment may be communicatively connected via network 502, which is the medium used to provide communications links between various devices and computer systems communicatively connected. Network 502 may include permanent connections such as wire or fiber optics cables and temporary connections made through telephone connections and wireless transmission connections, for example, and may include routers, switches, gateways and other hardware to enable a communication channel between the systems connected via network 502. Network 502 may represent one or more of packet-switching based networks, telephony-based networks, broadcast television networks, local area and wire area networks, public networks, and restricted networks.

Network 502 and the systems communicatively connected to computer 500 via network 502 may implement one or more layers of one or more types of network protocol stacks which may include one or more of a physical layer, a link layer, a network layer, a transport layer, a presentation layer, and an application layer. For example, network 502 may implement one or more of the Transmission Control Protocol/Internet Protocol (TCP/IP) protocol stack or an Open Systems Interconnection (OSI) protocol stack. In addition, for example, network 502 may represent the worldwide collection of networks and gateways that use the TCP/IP suite of protocols to communicate with one another. Network 502 may implement a secure HTTP protocol layer or other security protocol for securing communications between systems.

In the example, network interface 532 includes an adapter 534 for connecting computer system 500 to network 502 through a link and for communicatively connecting computer system 500 to server 540 or other computing systems via network 502. Although not depicted, network interface 532 may include additional software, such as device drivers, additional hardware and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

Figure 6:
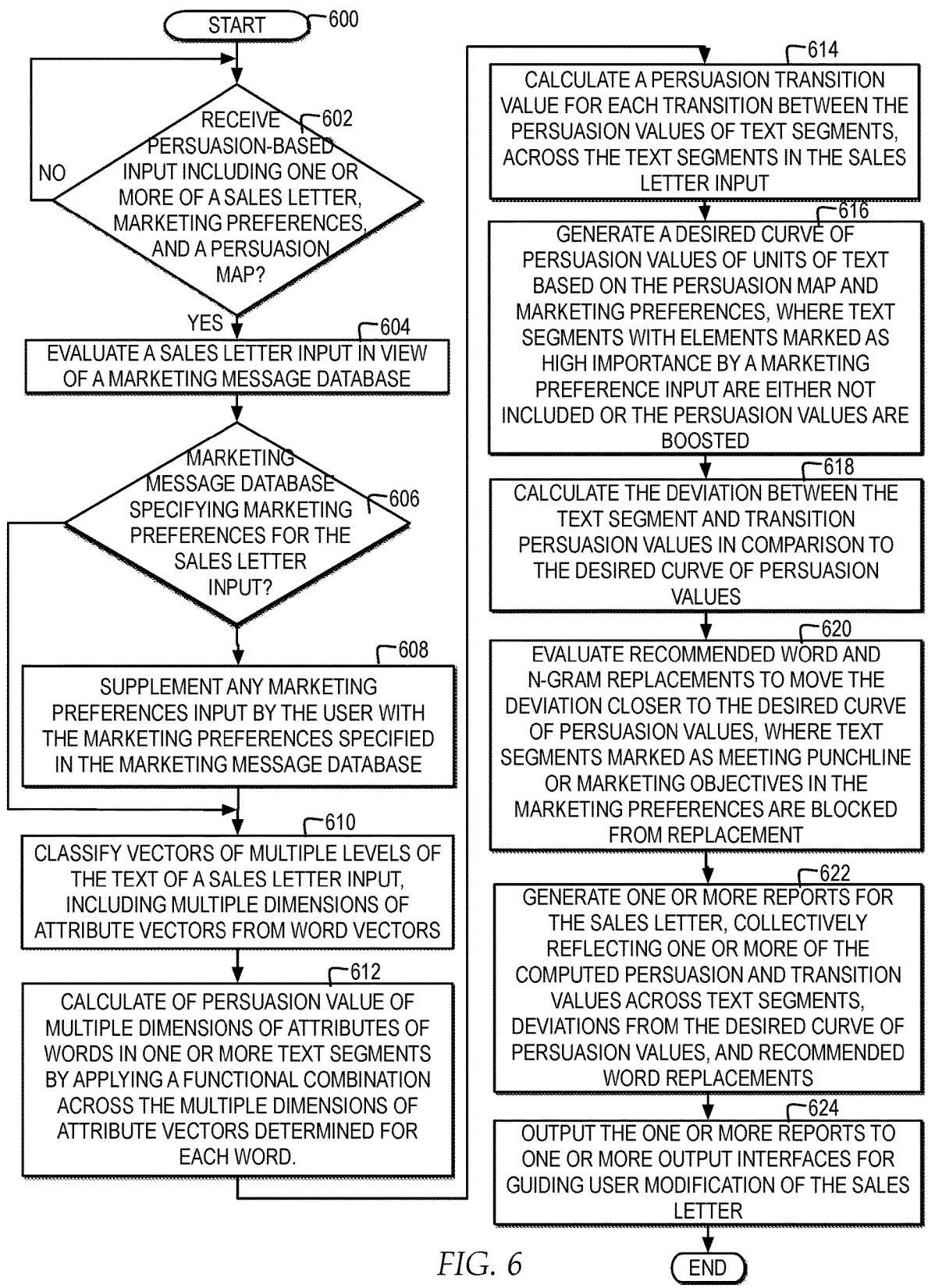
FIG. 6 illustrates a high-level logic flowchart of a process and computer program for guiding customization of a communication to meet one or more persuasion objectives of the communication at multiple levels.

In one embodiment, the operations performed by processor 512 may control the operations of flowchart of FIG. 6 and other operations described herein. Operations performed by processor 512 may be requested by software 550 or other code or the steps of one embodiment of the invention might be performed by specific hardware components that contain hardwired logic for performing the steps, or by any combination of programmed computer components and custom hardware components. In one embodiment, one or more components of computer system 500, or other components, which may be integrated into one or more components of computer system 500, may contain hardwired logic for performing the operations of flowcharts in FIG. 6.

In addition, computer system 500 may include multiple peripheral components that facilitate input and output. These peripheral components are connected to multiple controllers, adapters, and expansion slots, such as input/output (I/O) interface 526, coupled to one of the multiple levels of bus 522. For example, input device 524 may include, for example, a microphone, a video capture device, an image scanning system, a keyboard, a mouse, or other input peripheral device, communicatively enabled on bus 522 via I/O interface 526 controlling inputs. In addition, for example, output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 5, the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

FIG. 6 illustrates a high-level logic flowchart of a process and computer program for guiding customization of a communication to meet one or more persuasion objectives of the communication at multiple levels.

In one example, the process and computer program product starts at block 600 and thereafter proceeds to block 602. Block 602 illustrates a determination whether persuasion-based input is received including one or more of a sales letter, marketing preferences, and a persuasion map. At block 602, if persuasion-based input is received, then the process passes to block 604. Block 604 illustrates evaluating a sales letter input in view of a marketing message database. Next, block 606 illustrates a determination whether a marketing message database specifies marketing preferences for the sales letter input.

At block 606, if the marketing message database does not specify marketing preferences for the sales letter input, then the process passes to block 610. Otherwise, at block 606, if the marketing message database specifies marketing preferences for the sales letter input, then the process passes to block 608. Block 608 illustrates supplementing any marketing preferences input by the user with the marketing preferences specified in the marketing message database, and the process passes to block 610.

Block 610 illustrates classifying vectors of multiple levels of the text of a sales letter input, including multiple dimensions of attribute vectors from word vectors. Next, block 612 illustrates calculating a persuasion value of multiple dimensions of attributes of words in one or more text segments by applying a functional combination across the multiple dimensions of attribute factors determined for each word in the text segment. Thereafter, block 614 illustrates calculating a persuasion transition value for each transition between the persuasion values of text segments, across the text segments in the sales letter input. Next, block 616 illustrates generating a desired curve of persuasion values of units of text based on the persuasion map and marketing preferences by taking a progressive convergence between the persuasion factors for the entry and exit points of the unit of text, where text segments with elements marked as high importance by a marketing preference input are either not included or the persuasion values are boosted with a higher deviation curve. Thereafter, block 618 illustrates calculating the deviation between the text segment and transition persuasion values, in comparison to the desired curve of persuasion values. Next, block 620 illustrates evaluating recommended word and n-gram replacements to move the deviation closer to the desired curve of persuasion values, where text segments marked as meeting punchline or marketing objectives in the marketing preferences are blocked from replacement. Thereafter, block 622 illustrates generating one or more reports for the sales letter, collectively reflecting one or more of the computed persuasion and transition values across text segments, deviations from the desired curve of persuasion values, and recommended word replacements. Next, block 624 illustrates outputting the one or more reports for guiding user modification of the sales letter, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A computer-implemented method comprising:
receiving, by a computer, a persuasion-based input comprising: (i) a text and (ii) one or more marketing objectives for the text to persuade a desired response;
supplementing, by the computer, the received one or more marketing objectives with additional marketing objectives specified in a database;
evaluating, by the computer, a plurality of persuasion values of a plurality of text segments of the text and a plurality of persuasion transition values consecutively between respective persuasion values of the plurality of persuasion values across the plurality of text segments by applying, by the computer, an emotional attribute analysis classifier, a sentiment analysis classifier and tone analysis classifier to a separate word of a plurality of words of the text to identify a separate dimension of a separate word attribute vector for each separate word, wherein:
the plurality of persuasion factors include (i) an emotion, (ii) a sentiment, and (iii) a tone; and
the text is embedded to model a set of phrases to vectors of numerical values to manage large volumes of the text as vector values;

generating, by the computer, a desired curve of persuasion factors across the plurality of text segments according to the one or more marketing objectives by taking a progressive convergence between each selection of separate persuasion factors for each separate entry point and exit point to each respective text segment, wherein the desired curve is generated based at least on assigning the sentiment and the tone to each of the plurality of persuasion factors;

determining, by the computer, that one or more of the plurality of text segments is outside the desired curve;

recommending, by the computer, one or more replacement words to replace one or more selected words in text corresponding to the one or more of the plurality of text segments outside the desired curve to move a deviation between the plurality of persuasion values and the plurality of transition values in comparison to the desired curve of persuasion factors;

generating, by the computer, a visual representation of the desired curve of persuasion factors corresponding to the plurality of persuasion values; and outputting, by the computer, the one or more replacement words and the visual representation to one or more types of interfaces, wherein the one or more replacement words are provided to a user of the one or more types of interfaces in a step-by-step guidance that includes recommended adjustments to the text at different points according to a persuasion map between respective text segment.

2. The method according to claim 1, further comprising:
receiving, by the computer, the text comprising a sales letter and the marketing objectives comprising the persuasion map that specifies one or more parameters of separate persuasion factors for each separate entry point and exit point to each respective text segment of the plurality of text segments.

3. The method according to claim 1, further comprising:
receiving, by the computer, the text comprising a sales letter and the marketing objectives comprising one or more high importance features; and generating, by the computer, the desired curve of persuasion factors across the plurality of text segments according to the one or more marketing objectives, wherein a first selection of portions of the desired curve of persuasion factors for a first selection of the text segments not comprising the one or more high importance features is calculated based on a progressive convergence and a second selection of portions of the desired curved of persuasion factors for a second selection of text segments comprising the one or more high importance features is calculated based on a higher derivation curve than applied by the progressive convergence.

4. The method according to claim 1, wherein evaluating, by the computer, the plurality of persuasion values of the plurality of text segments of the text and the plurality of persuasion transition values consecutively between respective persuasion values of the plurality of persuasion values across the plurality of text segments further comprises:
calculating, by the computer, a separate persuasion value of the plurality of persuasion values of a particular text segment of the plurality of text segments by applying a functional combination to a plurality of separate word attribute vectors at each separate dimension for a selection of words of the plurality of words in the particular text segment.

5. The method according to claim 1, further comprising:
outputting, by the computer, a visual representation of each attribute dimension of a plurality of attribute dimensions of a separate vector calculated for each of the plurality of persuasion values and each of the plurality of persuasion transition values with a visual representation of the plurality of text segments.

6. The method according to claim 1, further comprising:
outputting, by the computer, a visual representation of the deviation of the plurality of persuasion values and plurality of transition values by text segment from the desired curve of persuasion factors.

7. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
program instructions to receive a persuasion-based input comprising: (i) a text and (ii) one or more marketing objectives for the text to persuade a desired response;

program instructions to supplement the received one or more marketing objectives with additional marketing objectives specified in a database;

program instructions to evaluate a plurality of persuasion values of a plurality of text segments of the text and a plurality of persuasion transition values consecutively between respective persuasion values of the plurality of persuasion values across the plurality of text segments by program instructions to apply an emotional attribute analysis classifier, a sentiment analysis classifier and tone analysis classifier to a separate word of a plurality of words of the text to identify a separate dimension of a separate word attribute vector for each separate word, wherein:
the plurality of persuasion factors include (i) an emotion, (ii) a sentiment and (iii) a tone; and
the text is embedded to model a set of phrases to vectors of numerical values to manage large volumes of the text as vector values;

program instructions to generate a desired curve of persuasion factors across a plurality of text segments according to the one or more marketing objectives by program instructions to take a progressive convergence between each selection of separate persuasion factors for each separate entry point and exit point to each respective text segment, wherein the desired curve is generated based at least on program instructions to assign the sentiment and the tone to each of the plurality of persuasion factors;

program instructions to determine that one or more of the plurality of text segments is outside the desired curve;

program instructions to recommend one or more replacement words to replace one or more selected words in text corresponding to the one or more of the plurality of text segments outside the desired curve to move a deviation between the plurality of persuasion values and the plurality of transition values in comparison to the desired curve of persuasion factors;

program instructions to generate a visual representation of the desired curve of persuasion factors corresponding to the plurality of persuasion values; and program instructions to output the one or more replacement words and the visual representation to one or more types of interfaces, wherein the one or more replacement words are provided to a user of the one or more types of interfaces in a step-by-step guidance that includes recommended adjustments to the text at different points according to a persuasion map between respective text segment.

8. The computer system according to claim 7, the program instructions further comprising:
program instructions to receive the text comprising a sales letter and the marketing objectives comprising the persuasion map that specifies one or more parameters of separate persuasion factors for each separate entry point and exit point to each respective text segment of the plurality of text segments.

9. The computer system according to claim 7, the program instructions further comprising:
program instructions to receive the text comprising a sales letter and the marketing objectives comprising one or more high importance features; and
program instructions to generate the desired curve of persuasion factors across the plurality of text segments according to the one or more marketing objectives, wherein a first selection of portions of the desired curve of persuasion factors for a first selection of the text segments not comprising the one or more high importance features is calculated based on a progressive convergence and a second selection of portions of the desired curved of persuasion factors for a second selection of text segments comprising the one or more high importance features is calculated based on a higher derivation curve than applied by the progressive convergence.

10. The computer system according to claim 7, the program instructions further comprising:
program instructions to calculate a separate persuasion value of the plurality of persuasion values of a particular text segment of the plurality of text segments by applying a functional combination to a plurality of separate word attribute vectors at each separate dimension for a selection of words of the plurality of words in the particular text segment.

11. The computer system according to claim 7, the program instructions further comprising:
program instructions to output a visual representation of each attribute dimension of a plurality of attribute dimensions of a separate vector calculated for each of the plurality of persuasion values and each of the plurality of persuasion transition values with a visual representation of the plurality of text segments.

12. The computer system according to claim 7, the program instructions further comprising:
program instructions to output a visual representation of the deviation of the plurality of persuasion values and plurality of transition values by text segment from the desired curve of persuasion factors.

13. A computer program product comprises one or more computer readable storage media having program instructions collectively stored thereon, wherein the one or more computer readable storage media are not a transitory signal per se, the program instructions executable by a computer to cause the computer to:
receive, by a computer, a persuasion-based input comprising: (i) a text and (ii) one or more marketing objectives for the text to persuade a desired response;
supplement, by the computer, the received one or more marketing objectives with additional marketing objectives specified in a database;
evaluate, by the computer, a plurality of persuasion values of a plurality of text segments of the text and a plurality of persuasion transition values consecutively between respective persuasion values of the plurality of persuasion values across the plurality of text segments by program instructions to apply an emotional attribute analysis classifier, a sentiment analysis classifier and tone analysis classifier to a separate word of a plurality of words of the text to identify a separate dimension of a separate word attribute vector for each separate word, wherein:
the plurality of persuasion factors include (i) an emotion, (ii) a sentiment and (iii) a tone; and
the text is embedded to model a set of phrases to vectors of numerical values to manage large volumes of the text as vector values;
generate, by the computer, a desired curve of persuasion factors across the plurality of text segments according to the one or more marketing objectives by program instructions to take a progressive convergence between each selection of separate persuasion factors for each separate entry point and exit point to each respective text segment, wherein the desired curve is generated based at least on program instructions to assign the sentiment and the tone to each of the plurality of persuasion factors;
determine, by the computer, that one or more of the plurality of text segments is outside the desired curve;
recommend, by the computer, one or more replacement words to replace one or more selected words in text corresponding to the one or more of the plurality of text segments outside the desired curve to move a deviation between the plurality of persuasion values and plurality of transition values in comparison to the desired curve of persuasion factors;
generate a visual representation of the desired curve of persuasion factors corresponding to the plurality of persuasion values; and
output, by the computer, the one or more replacement words and the visual representation to one or more types of interfaces, wherein the one or more replacement words are provided to a user of the one or more types of interfaces in a step-by-step guidance that includes recommended adjustments to the text at different points according to a persuasion map between respective text segment.

14. The computer program product according to claim 13, further comprising the program instructions executable by the computer to cause the computer to:
receive, by the computer, the text comprising a sales letter and the marketing objectives comprising the persuasion map that specifies one or more parameters of separate persuasion factors for each separate entry point and exit point to each respective text segment of the plurality of text segments.

15. The computer program product according to claim 13, further comprising the program instructions executable by the computer to cause the computer to:
receive, by the computer, the text comprising a sales letter and the marketing objectives comprising one or more high importance features; and
generate, by the computer, the desired curve of persuasion factors across the plurality of text segments according to the one or more marketing objectives, wherein a first selection of portions of the desired curve of persuasion factors for a first selection of text segments not comprising the one or more high importance features is calculated based on a progressive convergence and a second selection of portions of the desired curved of persuasion factors for a second selection of text segments comprising the one or more high importance features is calculated based on a higher derivation curve than applied by the progressive convergence.

16. The computer program product according to claim 13, further comprising the program instructions executable by the computer to cause the computer to:
calculate, by the computer, a separate persuasion value of the plurality of persuasion values of a particular text segment of the plurality of text segments by applying a functional combination to a plurality of separate word attribute vectors at each separate dimension for a selection of words of the plurality of words in the particular text segment.

17. The computer program product according to claim 13, further comprising the program instructions executable by the computer to cause the computer to:
output, by the computer, a visual representation of each attribute dimension of a plurality of attribute dimensions of a separate vector calculated for each of the plurality of persuasion values and each of the plurality of persuasion transition values with a visual representation of the plurality of text segments.

18. The computer program product according to claim 13, further comprising the program instructions executable by the computer to cause the computer to:
output, by the computer, a visual representation of the deviation of the plurality of persuasion values and plurality of transition values by text segment from the desired curve of persuasion factors.

* * * * *